United States Patent
Gallucci et al.

(10) Patent No.: US 9,006,319 B2
(45) Date of Patent: Apr. 14, 2015

(54) HYDROSTABLE POLYETHERIMIDE BLENDS, METHODS OF MANUFACTURE, AND ARTICLES FORMED THEREFROM

(75) Inventors: Robert Russell Gallucci, Mt. Vernon, IN (US); Mark A. Sanner, Newburgh, IN (US); Georgios S. Zafiris, Glastonbury, CT (US)

(73) Assignee: Sabic Global Technologies B.V. (NL)

( * ) Notice: Subject to any disclaimer, the term of this patent is extended or adjusted under 35 U.S.C. 154(b) by 414 days.

(21) Appl. No.: 13/020,897

(22) Filed: Feb. 4, 2011

(65) Prior Publication Data

US 2012/0029125 A1 Feb. 2, 2012

Related U.S. Application Data

(60) Provisional application No. 61/369,291, filed on Jul. 30, 2010.

(51) Int. Cl.

| | |
|---|---|
| *C08K 5/526* | (2006.01) |
| *C08L 69/00* | (2006.01) |
| *C08G 73/10* | (2006.01) |
| *C08L 79/08* | (2006.01) |
| C08K 3/34 | (2006.01) |
| C08K 5/13 | (2006.01) |
| C08K 5/49 | (2006.01) |

(52) U.S. Cl.
CPC ........... *C08L 69/005* (2013.01); *C08G 73/1046* (2013.01); *C08G 73/1071* (2013.01); *C08K 3/346* (2013.01); *C08K 5/13* (2013.01); *C08K 5/49* (2013.01); *C08L 69/00* (2013.01); *C08L 79/08* (2013.01)

(58) Field of Classification Search
CPC ...... C08G 73/1046; C08L 69/00; C09L 79/08
USPC ......................................................... 524/115
See application file for complete search history.

(56) References Cited

U.S. PATENT DOCUMENTS

| | | |
|---|---|---|
| 2,465,319 A | 3/1949 | Whinfield et al. |
| 3,047,539 A | 7/1962 | Pengilly |
| 3,383,092 A | 5/1968 | Cazier |
| 3,671,487 A | 6/1972 | Abolins |
| 3,723,373 A | 3/1973 | Lucas |
| 4,324,882 A | 4/1982 | Takekoshi |
| 4,468,506 A | 8/1984 | Holub et al. |
| 4,548,997 A | 10/1985 | Mellinger et al. |
| 4,673,708 A | 6/1987 | Rock et al. |
| 4,687,819 A | 8/1987 | Quinn et al. |
| 5,229,482 A | 7/1993 | Brunelle |
| 5,521,230 A | 5/1996 | Bhatia |
| 5,521,258 A | 5/1996 | Cooper et al. |
| 6,133,360 A | 10/2000 | Barren et al. |
| 6,403,723 B1 | 6/2002 | Dumont |
| 6,541,548 B2 | 4/2003 | Weidner et al. |
| 6,605,659 B2 | 8/2003 | Blackburn et al. |
| 6,919,422 B2 * | 7/2005 | Gallucci et al. ............... 528/353 |
| 2006/0079615 A1 * | 4/2006 | DeRudder et al. ............ 524/128 |
| 2006/0084741 A1 * | 4/2006 | Blackburn et al. ............ 524/425 |
| 2006/0084748 A1 * | 4/2006 | Gallucci et al. ............... 524/494 |

FOREIGN PATENT DOCUMENTS

| | | |
|---|---|---|
| EP | 2053091 A1 | 4/2009 |
| WO | 2004113446 A3 | 12/2004 |
| WO | 2006044257 A1 | 4/2006 |
| WO | WO2009/095825 A2 | 8/2009 |

OTHER PUBLICATIONS

Irganox 1010, Ciba, Aug. 1998.*
International Search Report for PCT/US2011/044213 mailed Oct. 24, 2011, 4 pages.
Written Opinion of the International Searching Authority for PCT/US2011/044213 mailed Oct. 24, 2011, 5 pages.
EP Office Action dated Sep. 19, 2014, three pages.
Chinese Office Action dated Oct. 28, 2014. Chinese Patent Application No. 201180037541.6 (untranslated).

* cited by examiner

*Primary Examiner* — Doris Lee
(74) *Attorney, Agent, or Firm* — Cantor Colburn LLP; Diderico van Eyl

(57) ABSTRACT

A composition comprising, based on the total weight of the composition, from 10 to 90 wt. % of a polyetherimide with a weight average molecular weight from 10,000 to 80,000 Daltons; from 10 to 90 wt. % of a polymer selected from polycarbonates, polyester-polycarbonates, polyalkylene terephthalates, or a combination thereof, from 0.005 to 1 wt. % of a hydrotalcite having a particle size of less than 10 micrometer and a magnesium oxide to aluminum oxide mole ratio of 1.0 to 5.0; from 0.01 to 1.0 wt. % of a phosphorus-containing stabilizer; from 0.01 to 1.00 wt. % of a hindered phenol stabilizer; optionally, from 0 to 3 wt. % of a polyolefin; and optionally, from 0 to 5 wt. % of an inorganic metal oxide.

24 Claims, No Drawings

HYDROSTABLE POLYETHERIMIDE BLENDS, METHODS OF MANUFACTURE, AND ARTICLES FORMED THEREFROM

BACKGROUND OF THE INVENTION

This disclosure relates to polyimide compositions, and in particular hydrostable blends of polyetherimide/polycarbonate and polyetherimide/polycarbonate-ester compositions, as well as their method of manufacture and articles formed from the polyimide compositions.

Polyimides (PI), and in particular polyetherimides (PEI), are amorphous, transparent high performance polymers having a glass transition temperature (Tg) of greater than 180° C. These polymers further have high strength, heat resistance, and modulus, and broad chemical resistance. Polyetherimides are widely used in applications as diverse as automotive, telecommunication, aerospace, electrical/electronics, transportation, and healthcare. Filled and unfilled PEI compositions further comprising a polycarbonate (PC), polycarbonate-ester (PCE), and/or polyalkylene terephthalate (PET) are particularly useful as molded parts for metal replacement, for example in automotive and electrical/electronic applications. PEI-PC, PEI-PCE, and PEI/PET blends have good mechanical and thermal properties, including excellent dimensional stability at high temperatures.

There has long been a need in the art for PEI/PC, PEI/PCE, or PEI/PET compositions, in particular PEI-PC and PEI-PCE compositions that are more hydrostable. Such compositions would be useful for the manufacture of articles used in the food service and the medical industries, which are required to undergo sterilization conditions that are often stringent. Although PCE has the impact strength needed for these applications, there remains a continuing need for compositions that can withstand the autoclave sterilization procedure. Conversely, PEI can withstand the autoclave sterilization procedure but is too brittle to meet the toughness requirement. Thus, there is a long felt need for the development of ductile compositions that are able to withstand repeated sterilization conditions, particularly autoclave conditions, without distorting, cracking, or blistering. It would further be advantageous if improved hydrostability could be achieved without significantly adversely affecting the good mechanical and thermal properties of the compositions, such as ductility.

SUMMARY OF THE INVENTION

Disclosed herein is a composition comprising, based on the total weight of the composition,
from 10 to 90 wt. % of a polyimide with a weight average molecular weight (Mw) of from 10,000 to 80,000 Daltons, of the formula

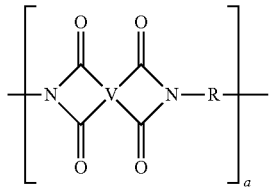

wherein
a is greater than 1,
V is a tetravalent aromatic group of the formula

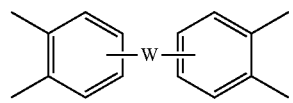

wherein W is a divalent moiety selected from —O—, —O—Z—O—, —SO$_2$—, or a combination thereof, wherein the divalent bonds of the —O—, the —O—Z—O—, and the —SO$_2$— group are in the 3,3', 3,4', 4,3', or the 4,4' positions, and wherein Z is a monocyclic or polycyclic moiety having 6 to 24 carbon atoms and optionally substituted with 1 to 8 C$_{1-8}$ alkyl groups, 1 to 8 halogen atoms, or a combination thereof, and R is selected from an aromatic hydrocarbon group having 6 to 20 carbon atoms, a halogenated derivative thereof, a straight or branched chain alkylene group having 2 to 20 carbon atoms, a cycloalkylene group having 3 to 20 carbon atoms, or a divalent group of the formula

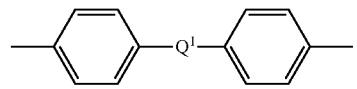

wherein $Q^1$ is —O—, —S—, —C(O)—, —SO$_2$—, —SO—, —C$_y$H$_{2y}$— wherein y is 1 to 5, and a halogenated derivative thereof;
from 10 to 90 wt. % of a polymer selected from a polycarbonate, polyester-polycarbonate, polyalkylene terephthalate, or a combination thereof;
from 0.005 to 1 wt. % of a hydrotalcite having a particle size of less than 10 micrometer and a magnesium oxide to aluminum oxide mole ratio of 1.0 to 5.0;
from 0.01 to 1.0 wt. % of a phosphorus-containing stabilizer;
from 0.01 to 1.00 wt. % of a hindered phenol stabilizer;
optionally, from 0 to 3 wt. % of a polyolefin; and
optionally, from 0 to 5 wt. % of an inorganic metal oxide.
In another embodiment,
In another embodiment, a composition comprises, based on the total weight of the composition,
from 15 to 85 wt. % of a polyimide with a weight average molecular weight (Mw) of from 40,000 to 80,000 Daltons, of the formula

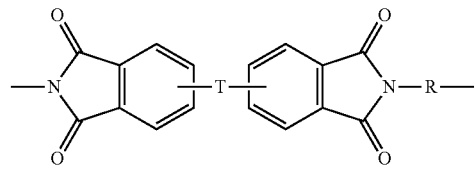

wherein
T is —O— or a group of the formula —O—Z—O— wherein the divalent bonds of the —O— or the —O—Z—O— group are in the 3,3', 3,4', 4,3', or the 4,4' positions and Z is a divalent radical of the formulae

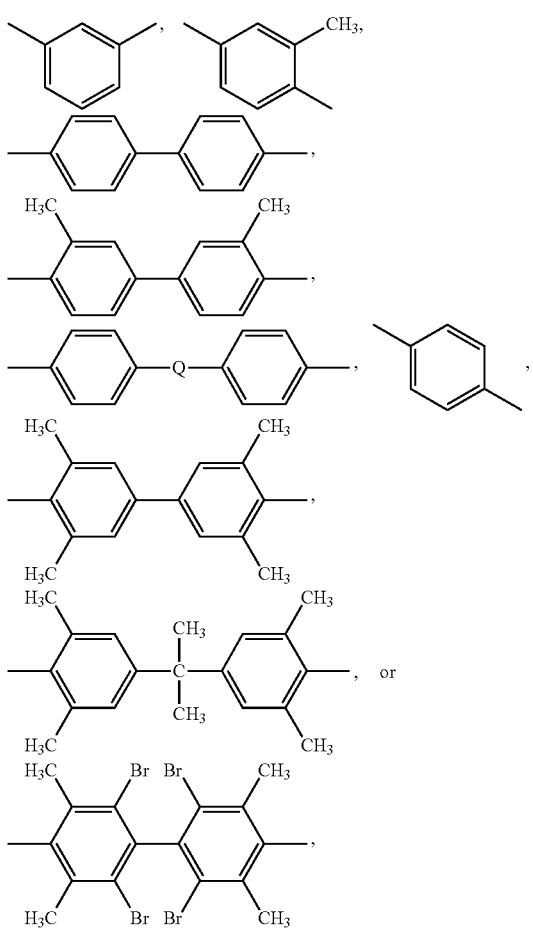

wherein Q is —O—, —S—, —C(O)—, —SO$_2$—, —SO—, or —C$_y$H$_{2y}$— wherein y is an integer from 1 to 5 and R is a divalent group of formula

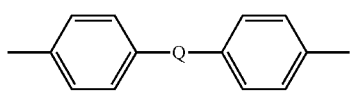

wherein Q is —O—, —S—, —C(O)—, —SO$_2$—, —SO—, or —C$_y$H$_{2y}$— wherein y is an integer from 1 to 5;

from 15 to 85 wt. % a polymer selected from a bisphenol A polycarbonate, a polyester-polycarbonate comprising units derived from bisphenol A, isophthalate and terephthalate, or a combination thereof;

from 0.1 to less than 0.8 wt. % of a calcined hydrotalcite having a particle size of less than 10 microns and a magnesium oxide to aluminum oxide mole ratio of 1.0 to 5.0;

from 0.01 to 0.3 wt. % of a triaryl phosphorus-containing stabilizer with a molecular weight greater than 300 Daltons;

from 0.01 to 0.3 wt. % of a hindered phenol stabilizer with a molecular weight greater than 300 Daltons;

from 0.1 to 5.0 wt. % of a titanium dioxide with a mean particle size of less than 5 micrometers.

In an embodiment, the above polyetherimides are manufactured via a halo-displacement process.

In another embodiment, a method of manufacture of the above compositions comprises melt blending the components of the aforementioned composition.

Articles comprising the above compositions are also disclosed.

A method of forming an article comprises shaping, extruding, blow molding, or injection molding the above compositions to form the article.

DETAILED DESCRIPTION OF THE INVENTION

The present inventors have discovered that, in one instance the use of hydrotalcite in conjunction with a blend of PEI made from a chloro-displacement method and a polycarbonate ester, surprisingly improves the hydrostability of the PEI-PCE composition. In another instance the hydrotalcite is also effective in improving the hydrolysis resistance of a PEI made by a nitro displacement method. In another instance, the hydrotalcite is also effective in improving the hydrolysis resistance of a PEI/PC and/or a PEI/PET composition. The compositions can also exhibit good chemical properties and mechanical properties, for example high tensile strength at yield. Melt flow of the compositions is also acceptable.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced item. As used herein, "combination thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and can or can not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both C$_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

All ASTM tests are based on the 2003 edition of the Annual Book of ASTM Standards unless otherwise indicated.

The polyetherimides are of formula (1)

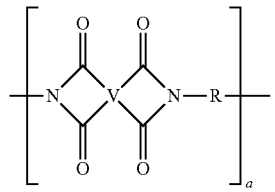

(1)

wherein a is greater than 1, for example 10 to 1,000 or more, or more specifically 10 to 500.

The group V in formula (1) is tetravalent linker having an ether group, an arylene sulfone group, or a combination of an ether group and an arylene sulfone group. (For convenience, the term "polyetherimide" as used herein includes polyetherimide sulfones.) Such linkers include but are not limited to: (a) substituted or unsubstituted, saturated, unsaturated or aromatic monocyclic and polycyclic groups having 5 to 50 carbon atoms, substituted with an ether group or a combination of an ether group and an arylene sulfone group; and (b) substituted or unsubstituted, linear or branched, saturated or unsaturated alkyl groups having 2 to 30 carbon atoms and substituted with an ether group or a combination of an ether group and an arylene sulfone group. Exemplary additional substitutions include, but are not limited to, amides, esters, and combinations comprising at least one of the foregoing.

The R group in formula (1) includes but is not limited to substituted or unsubstituted divalent organic group having 2 to 20 carbon atoms such as: (a) an aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2)

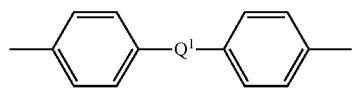

(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3)

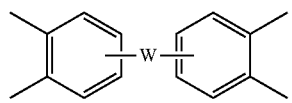

(3)

wherein W is a divalent moiety selected from —O—, —O—Z—O—, —SO$_2$—, or a combination thereof, wherein the divalent bonds of the —O—, —O—Z—O—, and —SO$_2$— group are in the 3,3', 3,4', 4,3', or the 4,4' positions, and wherein Z is a monocyclic or polycyclic moiety having 6 to 24 carbon atoms and optionally substituted with 1 to 6 C$_{1-8}$ alkyl groups, 1 to 8 halogen atoms, or a combination thereof, provided that the valence of Z is not exceeded. Examples of Z groups include, but are not limited, to divalent groups of formulas (4)

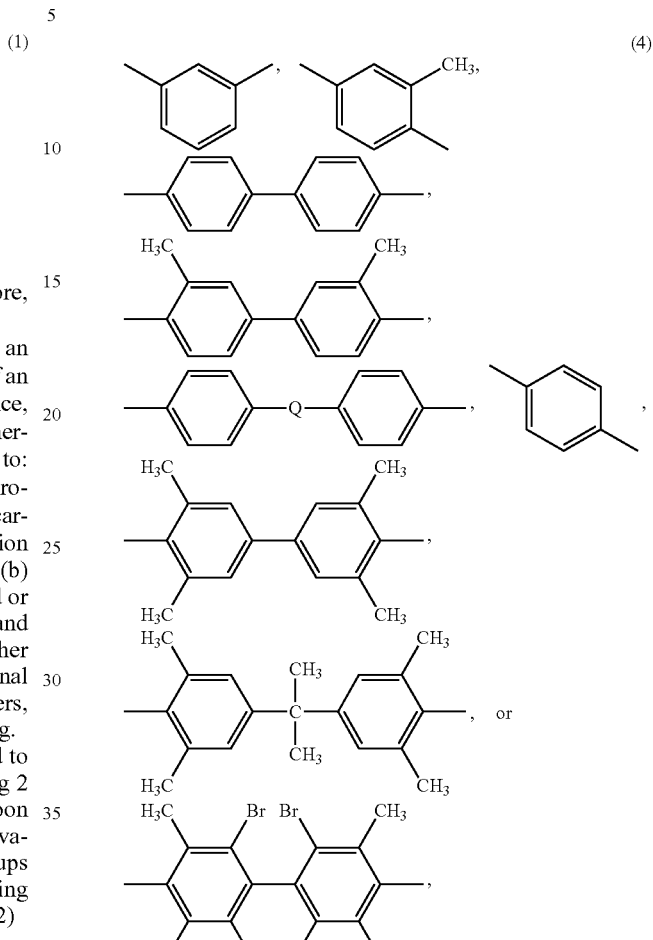

(4)

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In a specific embodiment, a is greater than 1; V is a tetravalent aromatic group of formula (3) wherein W is a divalent moiety selected from —O—, —O—Z—O—, or a combination thereof, wherein the divalent bonds of the —O— or the —O—Z—O— group are in the 3,3', 3,4', 4,3', or the 4,4' positions, and wherein Z is a monocyclic or polycyclic moiety having 6 to 24 carbon atoms and optionally substituted with 1 to 8 C$_{1-8}$ alkyl groups, 1 to 8 halogen atoms, or a combination thereof; and R is selected from an aromatic hydrocarbon group having 6 to 20 carbon atoms, a halogenated derivative thereof, a straight or branched chain alkylene group having 2 to 20 carbon atoms, a cycloalkylene group having 3 to 20 carbon atoms, or a divalent group of the formula (2) wherein $Q^1$ is —O—, —S—, —C(O)—, —SO$_2$—, —SO—, —C$_y$H$_{2y}$— wherein y is 1 to 5, and a halogenated derivative thereof.

In another specific embodiment, the polyetherimide comprises more than 1, specifically 10 to 1,000, or more specifically, 10 to 500 structural units, of formula (5)

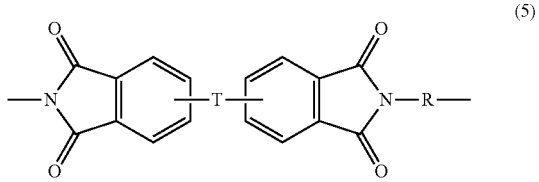

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (4) as defined above; and R is a divalent group of formula (2) as defined above. In a specific embodiment, R is m-phenylene.

In another specific embodiment, the polyetherimide sulfones comprise ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, the polyetherimide sulfone can comprise more than 1, specifically 10 to 1,000, or more specifically, 10 to 500 structural units of formula (6)

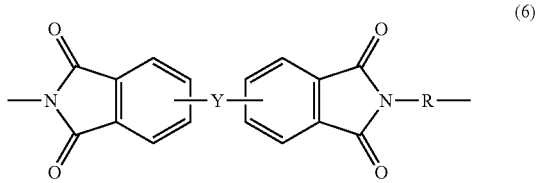

(6)

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups. In a specific embodiment, R is m-phenylene, p-phenylene diarylsulfone, or a combination thereof.

It is to be understood that the polyetherimides can optionally comprise linkers V that do not contain ether or ether and sulfone groups, for example linkers of formula (7).

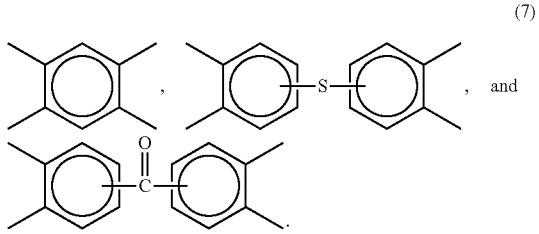

(7)

Imide units containing such linkers are generally be present in amounts ranging from 0 to 10 mole % of the total number of units, specifically 0 to 5 mole %. In one embodiment no additional linkers V are present in the polyetherimides. In another specific embodiment, the polyetherimide comprises 10 to 500 structural units of formula (5) and the polyetherimide sulfone contains 10 to 500 structural units of formula (6).

The polyetherimides can be prepared by various methods, including, but not limited to, the reaction of a bis(phthalimide) for formula (8):

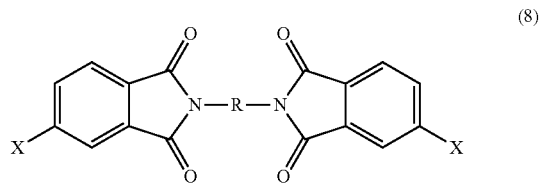

(8)

wherein R is as described above and X is a nitro group or a halogen. Bispthalimides (8) can be formed, for example, by the condensation of the corresponding anhydride of formula (9)

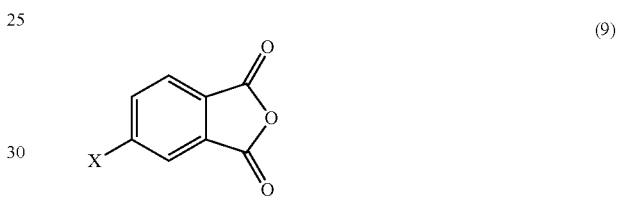

(9)

wherein X is a nitro group or halogen, with an organic diamine of the formula (10)

$$H_2N-R-NH_2 \quad (10)$$

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl) toluene, bis (p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl)sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

A polyetherimide without sulfone groups and a polyetherimide sulfone can be used alone or in combination. In one embodiment, only a polyetherimide without sulfone groups is used. In another embodiment, the weight ratio of polyetherimide without sulfone groups: polyetherimide sulfone can be from 99:1 to 50:50.

The polyimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 500° C., as measured using differential scanning calorimetry (DSC) per ASTM test D3418. In some embodiments the polyimide, an in particular a polyetherimide has a glass transition temperature of 240 to 350° C.

The polyimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methylphthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of a diol, for example bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford the corresponding dianhydride, BPA-dianhydride (BPADA), which in turn is reacted with a diamine of formula (10), e.g., meta-phenylene diamine (MPD) in ortho-dichlorobenzene in an imidization-polymerization step to afford the product polyetherimide.

An alternative chemical route to polyetherimides having structure (1) is a process referred to a halo-displacement process, or a chloro-displacement process when X is Cl in formula (8). The chloro-displacement process is illustrated as follows: 4-chlorophthalic anhydride and a diamine (10) such as meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of a diol such as BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Polyetherimides prepared by nitro-displacement or chloro-displacement processes possess identical repeat unit structures, and materials of similar molecular weight should have essentially the same physical properties. For example, a mixture of 3-NPI and 4-NPI ultimately affords, via the nitro-displacement process, polyetherimide having the same physical properties as polyetherimide prepared in the chloro-displacement process from a similarly constituted mixture of 3-chloro- and 4-chlorophthalic anhydride.

However, it has been found that the method of manufacture of the PEI can affect the thermostability of compositions containing PEI, in particular compositions containing PEI and PC or PCE. In an embodiment, the PEI is manufactured via a halo-displacement process. Specifically, a PEI of formula (5) is a product of the reaction of a bishalophthalimide of the formula (8a)

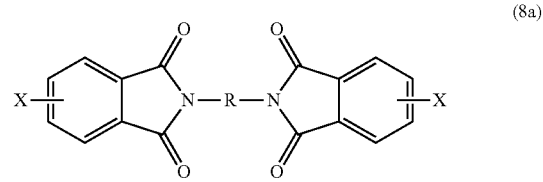

(8a)

wherein X is bromine or chlorine and R is a divalent group of formula (2)

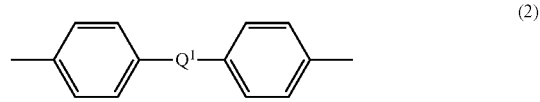

(2)

wherein $Q^1$ is —O—, —S—, —C(O)—, —SO$_2$—, —SO—, or —C$_y$H$_{2y}$— wherein y is an integer from 1 to 5, with a salt of the formula

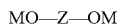

MO—Z—OM wherein M is an alkali metal salt and the divalent bonds of the —O—Z—O— group are in the 3,3', 3,4', 4,3', or the 4,4' positions and Z is a divalent radical of the formulae

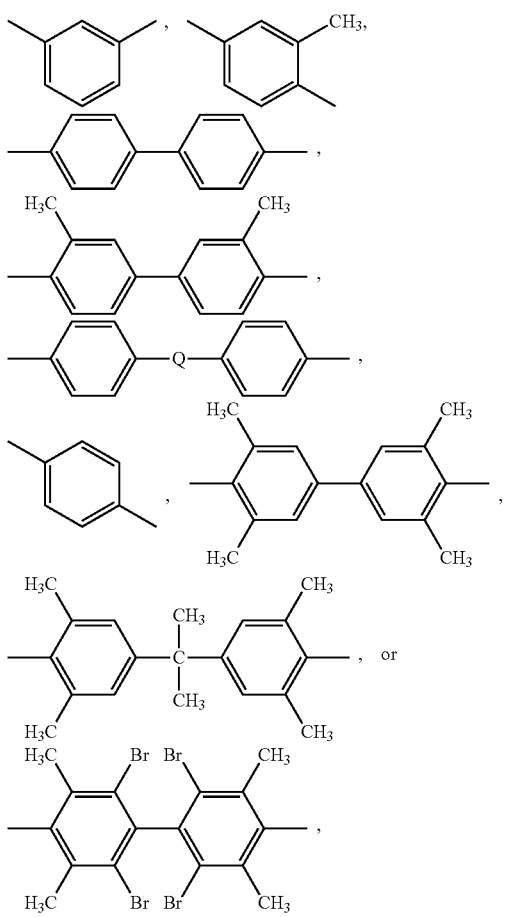

wherein Q is —O—, —S—, —C(O)—, —SO$_2$—, —SO—, or —C$_y$H$_{2y}$— wherein y is an integer from 1 to 5.

It has further been found by the inventors hereof that the hydrostability of a PEI/PC or a PEI/PCE composition can be improved to an unexpected degree by the addition of hydrotalcite. Hydrotalcite is a synthetic or naturally occurring alumino magnesium carbonate. Synthetic hydrotalcite is preferred for its consistency and low color. A specific hydrotalcites Without being bound by theory, it is believed that the hydrotalcite counteracts the presence of certain compounds in nitro or chloro-displaced PEI, for example sodium aryl phosphinates such as sodium phenyl phosphinate (SPP), also known as sodium benzene phosphinate. Use of SPP in the manufacture of PEI is described, for example, in U.S. Pat. No. 4,324,882.

The effective amount of hydrotalcite used to improve hydrolytic stability will depend on the amount and type of PEI, PC, and PEI. Generally the amount of calcined hydrotalcite will be from 0.005 to 1.0 wt % based on the total weight of the composition. In most instances, levels of from 0.01 to 0.5% will give improved hydrolysis resistance. In some instances the hydrotalcite may be calcined from 400 to 1000° C.

In another embodiment the hydrotalcite can have a magnesium oxide to aluminum oxide mole ratio in a range of from 1.0:1.0 to 5.0:1.0, that is, a range of from 1.0 to 5.0. Calcined hydrotalcite with an average particle size of less than or equal to 10 micrometers, specifically less than or equal to 5 micrometers may be used, for example to improve impact strength. In other instances, for example when food contact is desired, the hydrotalcite may have less than 30 ppm of elements selected from the group consisting of mercury, lead, cadmium, arsenic, bismuth and mixtures thereof.

The PEI/PC, PEI/PCE, or PEI/PET composition further comprises a polycarbonate and/or a polycarbonate-ester copolymer. Polycarbonates includes polymers having repeating structural carbonate units of formula (11)

in which at least 60 percent of the total number of R$^1$ groups contain aromatic moieties and the balance thereof are aliphatic, alicyclic, or aromatic. In an embodiment, each R$^1$ is a C$_{6-30}$ aromatic group, that is, contains at least one aromatic moiety. R$^1$ can be derived from a dihydroxy compound of the formula HO—R$^1$—OH, in particular of formula (12)

$$HO-A^1-Y^1-A^2-OH \quad (12)$$

wherein each of A$^1$ and A$^2$ is a monocyclic divalent aromatic group and Y$^1$ is a single bond or a bridging group having one or more atoms that separate A$^1$ from A$^2$. In an exemplary embodiment, one atom separates A$^1$ from A$^2$. Also included are bisphenol compounds of formula (13):

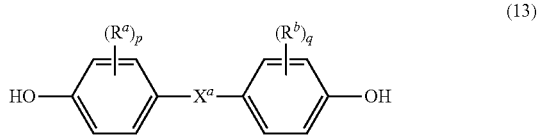

wherein R$^a$ and R$^b$ each represent a halogen atom or a monovalent hydrocarbon group and may be the same or different; p and q are each independently integers of 0 to 4; and X$^a$ is a bridging group connecting the two hydroxy-substituted aromatic groups, where the bridging group and the hydroxy substituent of each C$_6$ arylene group are disposed ortho, meta, or para (specifically para) to each other on the C$_6$ arylene group. In an embodiment, the bridging group X$^a$ a single bond, —O—, —S—, —S(O)—, —S(O)$_2$—, —C(O)—, or a C$_{1-18}$ organic group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. Exemplary C$_{1-18}$ organic groups include —C(R$^c$)(R$^d$)—, or —C(=R$^e$) wherein R$^c$ and R$^d$ each independently represent a hydrogen atom or a monovalent linear or cyclic hydrocarbon group and R$^e$ is a divalent hydrocarbon group In one embodiment, p and q is each 1, and R$^a$ and R$^b$ are each a C$_{1-3}$ alkyl group, specifically methyl, disposed meta to the hydroxy group on each arylene group. In another embodiment, X$^a$ is a C$_{1-18}$ alkylene group, a C$_{3-18}$ cycloalkylene group, a fused C$_{6-18}$ cycloalkylene group, or a group of the formula —B$^1$—W—B$^2$— wherein B$^1$ and B$^2$ are the same or different C$_{1-6}$ alkylene group and W is a C$_{3-12}$ cycloalkylidene group or a C$_{6-16}$ arylene group.

Other useful aromatic dihydroxy compounds of the formula HO—R¹—OH include compounds of formula (14)

(14)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (13) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-2-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (13).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute. Combinations of polycarbonates of different flow properties can be used to achieve the overall desired flow property.

In an embodiment polycarbonates are based on bisphenol A, in which each of $A^3$ and $A^4$ is p-phenylene and $Y^2$ is isopropylidene. The weight average molecular weight of the polycarbonate can be 5,000 to 100,000 Daltons, or, more specifically 10,000 to 65,000 Daltons, or, even more specifically, 15,000 to 35,000 Daltons.

In another embodiment the polycarbonate-ester copolymer comprises, based on the total weight of the copolymer, from 40 to less than 100 weight percent of carbonate units of formula (11) and from greater than 0 to 60 weight percent of arylate ester units of formula (15)

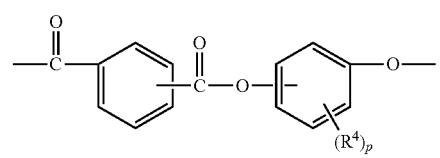

(15)

wherein each $R^4$ is independently a halogen or a $C_{1-4}$ alkyl, and p is 0 to 3. The arylate ester units can be derived from the reaction of a mixture of terephthalic acid and isophthalic acid or chemical equivalents thereof with compounds such as 5-methyl resorcinol, 5-ethyl resorcinol, 5-propyl resorcinol, 5-butyl resorcinol, 5-t-butyl resorcinol, 2,4,5-trifluoro resorcinol, 2,4,6-trifluoro resorcinol, 4,5,6-trifluoro resorcinol, 2,4,5-tribromo resorcinol, 2,4,6-tribromo resorcinol, 4,5,6-tribromo resorcinol, catechol, hydroquinone, 2-methyl hydroquinone, 2-ethyl hydroquinone, 2-propyl hydroquinone, 2-butyl hydroquinone, 2-t-butyl hydroquinone, 2,3,5-trimethyl hydroquinone, 2,3,5-tri-t-butyl hydroquinone, 2,3,5-trifluoro hydroquinone, 2,3,5-tribromo hydroquinone, or a combination comprising at least one of the foregoing compounds. In a specific embodiment, the polycarbonate-ester copolymer is a poly(isophthalate-terephthalate-resorcino-lester)-co-(bisphenol-A carbonate).

In another embodiment polyester-carbonate can comprise from greater than zero to 90 weight percent of a polymer containing recurring units of the formula:

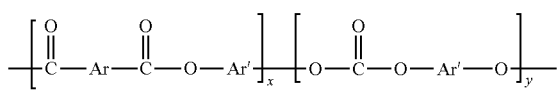
(16)

wherein Ar is divalent aromatic residue of a dicarboxylic acid or combination of dicarboxylic acids. Ar is thus an aryl group, and is most preferably the residue of isophthalic acid (17a), terephthalic acid (17b),

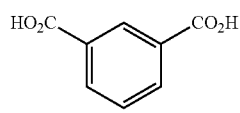
(17a)

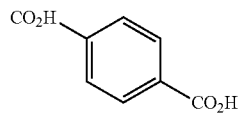
(17b)

or a combination thereof.

Further in formula (16), Ar' is divalent aromatic residue of a dihydric phenol of formula (18):

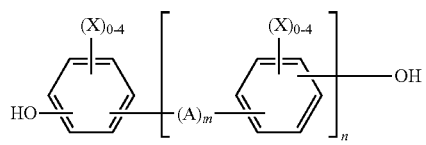
(18)

wherein A is a divalent $C_{1-15}$ hydrocarbon radical optionally substituted with one or more groups such as halogen; —S—, —S(O)$_2$— or —O—; each X is independently hydrogen, halogen, or a monovalent hydrocarbon radical such as a $C_{1-8}$ alkyl, $C_{6-18}$ aryl, $C_{7-14}$ arylalkylene, or a $C_{1-8}$ alkoxy; m is 0 or 1; and n is an integer of from 0 to 5. Ar' may thus be monocyclic, e.g., the residue of hydroquinone, or polycyclic, e.g., a residue of biphenol or bisphenol A. For example in an embodiment, Ar' is the divalent aromatic residue of a dihydric phenol or a mixture of dihydric phenols, specifically dihydric alcohols of formula (13) wherein $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4.

Further in the polycarbonate-ester (PCE) formula (16), x and y represent the respective weights of aromatic ester units and the carbonate units based on 100 parts total weight. Specifically, x, the aromatic ester content, is 20 to 100, specifically 30 to 95, still more specifically 50 to 95, and y, the carbonate content, is from more than zero 80 and preferably from 5 to 70, still more specifically 5 to 50. In general, any dicarboxylic acid conventionally used in the preparation of polyesters may be utilized in the preparation of polycarbonate-ester resins. However, the PCEs used herein are prepared with aromatic dicarboxylic acids, and in particular terephthalic acid, and mixtures thereof with isophthalic acid wherein the weight ratio of terephthalic acid to isophthalic acid is in the range of from 5:95 to 95:5. In this embodiment the PCE can be derived from reaction of bisphenol-A and phosgene with iso- and terephthaloyl chloride, and can have an intrinsic viscosity of 0.5 to 0.65 deciliters per gram (measured in methylene chloride at a temperature of 25° C.).

In a specific embodiment, Ar is divalent aromatic residue of a dicarboxylic acid or combination of dicarboxylic acids, specifically terephthalic acid and isophthalic acid ratio from 5:95 to 95:5; Ar' is the divalent aromatic residue of a dihydric phenol or a mixture of dihydric phenols of formula (13) wherein $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4; and x is 20 to 100, specifically 30 to 95, still more specifically 50 to 95, and y is from more than zero 80, specifically 5 to 70, still more specifically 5 to 50. Each of the foregoing is based on the weight of the PCE.

Blends of different polycarbonate-esters may also be used in these compositions.

The polycarbonate-ester comprises terminal groups derived from the reaction with a chain stopper (also referred to as a capping agent), which limits molecular weight growth rate, and so controls molecular weight in the polycarbonate. The chain stoppers are monophenolic compounds of formula (19)

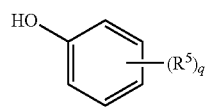
(19)

wherein each $R^5$ is independently halogen, $C_{1-22}$ alkyl, $C_{1-22}$ alkoxy, $C_{1-22}$ alkoxycarbonyl, $C_{6-10}$ aryl, $C_{6-10}$ aryloxy, $C_{6-10}$ aryloxycarbonyl, $C_{6-10}$ arylcarbonyl, $C_{7-22}$ alkylaryl, $C_{7-22}$ arylalkyl, $C_{6-30}$ 2-benzotriazole, or triazine, and q is 0 to 5. As used herein, $C_{6-16}$ benzotriazole includes unsubstituted and substituted benzotriazoles, wherein the benzotriazoles are substituted with up to three halogen, cyano, $C_{1-8}$ alkyl, $C_{1-8}$ alkoxy, $C_{6-10}$ aryl, or $C_{6-10}$ aryloxy groups.

Suitable monophenolic chain stoppers of formula (19) include phenol, p-cumyl-phenol, p-tertiary-butyl phenol, hydroxy diphenyl, monoethers of hydroquinones such as p-methoxyphenol, alkyl-substituted phenols including those with branched chain alkyl substituents having 8 to 9 carbon atoms, monophenolic UV absorber such as 4-substituted-2-hydroxybenzophenone, aryl salicylate, monoesters of diphenols such as resorcinol monobenzoate, 2-(2-hydroxyaryl)-benzotriazole, 2-(2-hydroxyaryl)-1,3,5-triazines, and the like. Specific monophenolic chain stoppers include phenol, p-cumylphenol, and resorcinol monobenzoate.

It is also within the scope of the invention to use other types of chain stoppers, for example monocarboxylic acid halides, monohaloformates, and the like. Such chain stoppers can be of formula (19) wherein a —C(O)X or —OC(O)Cl group is present in place of the phenolic hydroxyl group, and X is a halogen, particularly bromine or chlorine. Monocarboxylic acid chlorides and monochloroformates are particularly useful. Exemplary monocarboxylic acid chlorides include monocyclic, monocarboxylic acid chlorides such as benzoyl chloride, $C_{1-22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and mixtures thereof; polycyclic, monocarboxylic acid chlorides such as trimellitic anhydride chloride, and naphthoyl chloride; and mixtures of monocyclic and polycyclic monocarboxylic acid chlorides. Chlorides of aliphatic monocarboxylic acids with up to 22 carbon atoms, and functionalized chlorides of aliphatic monocarboxylic acids, such as acryloyl chloride and methacryloyl chloride, are also contemplated. Monochloroformates include monocyclic monochloroformates, such as phenyl chloroformate, alkyl-substituted phenyl chloroformate, p-cumyl phenyl chloroformate, toluene chloroformate, and mixtures thereof. A combination of different chain stoppers can be used, for example a combination of two different monophenolic chain stoppers or a combination of a monophenolic chain stopper and a monochloroformate chain stopper.

The type and amount of chain stopper used in the manufacture of the polycarbonate-esters are selected to provide copolymers having an Mw of 1,500 to 100,000 Daltons, specifically 1,700 to 50,000 Daltons, and more specifically 2,000 to 40,000 Daltons. Molecular weight determinations are performed using gel permeation chromatography, using a crosslinked styrene-divinylbenzene column and calibrated to bisphenol-A polycarbonate references. Samples are prepared at a concentration of 1 milligram per milliliter, and are eluted at a flow rate of 1.0 milliliter per minute.

The polyester-polycarbonates can be manufactured by processes such as interfacial polymerization and melt polymerization as are known in the art. The polyester-polycarbonates are generally of high molecular weight and have an intrinsic viscosity, as determined in chloroform at 25° C. of 0.3 to 1.5 dl/gm, and preferably from 0.45 to 1.0 dl/gm. These polyester-polycarbonates may be branched or unbranched and generally will have a weight average molecular weight of from 10,000 to 200,000, preferably from 20,000 to 100,000 as measured by gel permeation chromatography.

The polyalkylene terephthalates (PET)s include both crystalline and amorphous polyesters having repeating structural units of formula (20)

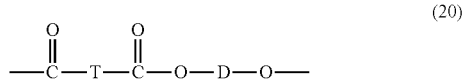

(20)

wherein each T includes units derived from terephthalic acid or a chemical equivalent thereof; and each D is independently a divalent $C_{2-20}$ alkylene group, $C_{6-20}$ alicyclic group, $C_{6-20}$ aromatic group, or poly($C_{2-6}$ oxyalkylene) group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Other dicarboxylic acid units that can be present in the PETs include various $C_{6-20}$ aromatic dicarboxylic acids such as isophthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used, wherein the weight ratio of isophthalic acid to terephthalic acid is 25:75 to 2:98. Exemplary $C_{5-20}$ cycloaliphatic dicarboxylic acids contain at least one cycloaliphatic moiety and include monocyclo- and bicycloaliphatic acids such as decahydronaphthalene dicarboxylic acids, norbornene dicarboxylic acids, bicyclooctane dicarboxylic acids, 1,4-cyclohexanedicarboxylic acid (both cis and trans), specifically trans-1,4-cyclohexanedicarboxylic acid, 1,4-hexylenedicarboxylic acid, and the like. Aliphatic $C_{2-20}$ dicarboxylic acids such as adipic acid, azelaic acid, dicarboxyl dodecanoic acid, and succinic acid can also be useful.

Exemplary diols useful in the preparation of the PETS include aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Exemplary cycloaliphatic diols include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like. Chemical equivalents of the diols include esters, such as $C_{1-3}$ dialkyl esters, diaryl esters, and the like.

Specific exemplary PETs include poly(ethylene terephthalate) (PET), poly(butylene terephthalate) (PBT), and poly(1,3-propylene terephthalate) (PPT). Another class of polyesters includes at least one cycloaliphatic moiety, for example poly(1,4-cyclohexylendimethylene terephthalate) (PCT), and poly(1,4-cyclohexylenedimethylene terephthalate-co-isophthalate) (PCTA). Other useful polyesters are copolyesters derived from terephthalic acid and/or isophthalic acid and a mixture comprising a linear $C_{2-6}$ aliphatic diol (specifically ethylene glycol and butylene glycol); and a $C_{6-12}$ cycloaliphatic diol (specifically 1,4-hexane diol, dimethanol decalin, dimethanol bicyclooctane, 1,4-cyclohexane dimethanol and its cis- and trans-isomers, 1,10-decane diol, and the like) or a linear poly($C_{2-6}$ oxyalkylene)diol (specifically, poly(oxyethylene)glycol) and poly(oxytetramethylene)glycol). The poly(oxyalkylene)glycol can have a molecular weight of 200 to 10,000 grams per mole, more specifically 400 to 6,000 grams per mole, even more specifically 600 to 2,000 grams per mole, and a carbon to oxygen ratio of 1 to 10, more specifically 1.5 to 6, even more specifically 2.0 to 4.3. The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG). Also included are thermoplastic poly(ester-ether) (TPEE) copolymers such as poly(ethylene-co-poly(oxytetramethylene) terephthalate. Also contemplated for use herein are any of the above polyesters with minor amounts, e.g., from 0.5 to 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The polyesters can be obtained by methods well known to those skilled in the art, including, for example, interfacial polymerization, melt-process condensation, solution phase condensation, and transesterification polymerization. Such polyester resins are typically obtained by the condensation or ester interchange polymerization of the diacid or diacid chemical equivalent component with the diol or diol chemical equivalent component with the component. The condensation reaction may be facilitated by the use of a catalyst of the type known in the art, with the choice of catalyst being determined by the nature of the reactants. For example, a dialkyl ester such as dimethyl terephthalate can be transesterified with butylene glycol using acid catalysis, to generate poly(butylene terephthalate).

The amount of polyimide used in the PEI/PC, PEI/PCE, or PEI/PET composition can vary widely, and is that amount effective to provide the desired physical properties and hydrostability. In some instances the polyimide is present in an amount from 10 wt. % (weight percent) to 90 wt. %, specifically 20 to 80 wt. %, more specifically 30 to 70 wt. %, and still more specifically 40 to 60 wt. %, all based on the total weight of the composition.

The amount of polycarbonate used in the PEI/PC composition can vary widely, and is that amount effective to provide the desired physical properties and hydrostability. When present, the polycarbonate is present in the composition in an amount from 10 wt. % to 90 wt. %, specifically 20 to 80 wt. %, more specifically 30 to 70 wt. %, and still more specifically 40 to 60 wt. %, all based on the total weight of the composition.

The amount of polycarbonate-ester used in the PEI/PCE composition can vary widely, and is that amount effective to provide the desired physical properties and hydrostability. When present, the polycarbonate-ester is present in the composition in an amount from 10 wt. % to 90 wt. %, specifically 20 to 80 wt. %, more specifically 30 to 70 wt. %, and still more specifically 40 to 60 wt. %, all based on the total weight of the composition.

The amount of polyalkylene terephthalate used in the PEI/PET composition can vary widely, and is that amount effective to provide the desired physical properties and hydrostability. When present, the polyalkylene terephthalate is present in the composition in an amount from 10 wt. % to 90 wt. %, specifically 20 to 80 wt. %, more specifically 30 to 70 wt. %, and still more specifically 40 to 60 wt. %, all based on the total weight of the composition.

The compositions can further optionally comprise a reinforcing filler, for example a flat, plate-like, and/or fibrous filler. Typically, the flat, plate-like filler has a length and width at least ten times greater than its thickness, where the thickness is from 1 to 1000 microns. Exemplary reinforcing fillers of this type include glass flakes, mica, flaked silicon carbide, aluminum diboride, aluminum flakes, and steel flakes; wollastonite including surface-treated wollastonite; calcium carbonate including chalk, limestone, marble and synthetic, precipitated calcium carbonates, generally in the form of a ground particulates; talc, including fibrous, modular, needle shaped, and lamellar talc; kaolin, including hard, soft, calcined kaolin, and kaolin comprising various coatings known in the art to facilitate compatibility with the polymeric matrix resin; mica; and feldspar.

Exemplary reinforcing fillers also include fibrous fillers such as short inorganic fibers, natural mineral fibrous fillers, single crystal fibers, glass fibers, ceramic fibers and organic reinforcing fibrous fillers. Short inorganic fibers include, borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, including glass fibers such as E, ECR, S, and NE glasses and quartz, and the like can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 9 to 15 micrometers. In preparing molding compositions it is convenient to use reinforcing fibers such as fiberglass in the form of chopped strands of from 3 millimeters to 15 millimeters long. In articles molded from these compositions, on the other hand, shorter lengths will typically be encountered because during compounding considerable fragmentation may occur. Combinations of rigid fibrous fillers with flat, plate-like fillers can be used, for example to reduce warp of a molded article.

In some applications it may be desirable to treat the surface of the filler with a chemical coupling agent to improve adhesion to a thermoplastic resin in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the PEI/PC, PEI/PCE, or PEI/PET composition can vary widely, and is that amount effective to provide the desired physical properties and flame resistance. In some instances the reinforcing filler is present in an amount from more than 10 to 60 wt. %, more specifically 15 to 40 wt. %, and even more specifically 20 to 35 wt. % each based on the total weight of the composition.

The PEI/PC, PEI/PCE, or PEI/PET composition can optionally further comprise one or more other types of particulate fillers. Exemplary particulate fillers include silica powder, such as fused silica and crystalline silica; boron-nitride powder and boron-silicate powders; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and combinations thereof. All of the above fillers can be surface treated with silanes to improve adhesion and dispersion with the polymeric matrix resin. When present, the amount of additional particulate filler in the PEI/PC, PEI/PCE, or PEI/PET composition can vary widely, and is that amount effective to provide the desired physical properties and flame resistance. In some instances the particulate filler is present in an amount from 1 to 80 wt. %, specifically 5 to 30 wt. %, more specifically 5 to 20 wt. %, each based on the total weight of the composition.

The PEI/PC, PEI/PCE, or PEI/PET compositions can include various additives ordinarily incorporated into polymer compositions of this type, with the proviso that the additives are selected so as to not significantly adversely affect the desired properties of the composition. Exemplary additives include catalysts (for example, to facilitate reaction between an impact modifier and the polyester), antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAPHOS 168 and bis(2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2''-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination the organo phosphorous compounds may be of the same type or different types. For example, a combination can comprise two phosphite or a combination can comprise a phosphite and a phosphonite. In some embodiments, phosphorus-containing stabilizers with a molecular weight greater than or equal to 300 are useful. Phosphorus-containing stabilizers, for example an aryl phosphite are usually present in the composition in an amount from 0.005 to 3 wt. %, specifically 0.01 to 1.0 wt. %, based on total weight of the composition.

Hindered phenols may also be used as antioxidants, for example alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha,alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example greater than or equal to 300° C. Hindered phenol stabilizers, are usually present in the composition in an amount from 0.005 to 2 wt. %, specifically 0.01 to 1.0 wt. %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene and similar polyolefin homopolymers and copolymers can also be used a mold release agents. Mold release agents are typically present in the composition at 0.05 to 10 wt. %, based on total weight of the composition, specifically 0.1 to 5 wt. %. Preferred mold release agents will have high molecular weight, typically greater than 300, to prevent loss of the release agent from the molten polymer mixture during melt processing.

In particular, an optional polyolefin may be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE) or branched polyethylene. Polyolefins may also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt. %, specifically 0.1 to 8 wt. %, more specifically from 0.5 to 5 wt. %, all based on the total weight of the composition.

In some embodiments, the compositions may further include at least one additional polymer. Examples of such additional polymers include and are not limited to PPSU (polyphenylene sulfone), polyetherimides, PSU (polysulfone), PPET (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyimide), PBI (polybenzimidizole) and PAI (poly(amide-imide)), poly(ether sulfone), poly(aryl sulfone), polyphenylenes, polybenzoxazoles, polybenzthiazoles, as well as blends and co-polymers thereof. When present, the polymer is used in an amount from more than 0 to 20 wt. %, specifically 0.1 to 15 wt. %, more specifically from 0.5 to 10 wt. %, all based on the total weight of the composition. In an embodiment, no polymer other than the PEI, the PC, the PCE, and/or the PET, and optional polyolefin as described herein is present in the composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt. %, specifically 0 to 5 wt. %, based on the total weight of the composition. In some instances, where improved impact is desired pigments such as titanium dioxide will have a mean particle size of less than 5 microns.

The composition can also optionally include a fluoropolymer in an effective amount to provide anti-drip or other beneficial properties to the resin composition. In one instance the fluoropolymer is present in an amount 0.01 to 5.0 wt. % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2=CF_2$, $CHF=CF_2$, $CH_2=CF_2$ and $CH_2=CHF$ and fluoro propylenes such as, for example, $CF_3CF=CF_2$, $CF_3CF=CHF$, $CF_3CH=CF_2$, $CF_3CH=CH_2$, $CF_3CF=CHF$, $CHF_2CH=CHF$ and $CF_3CF=CH_2$.

Copolymers comprising structural units derived from two or more fluorinated alpha-olefin monomers can also be used, for example poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyimide resin. For example, an aqueous dispersion of fluoropolymer and a polycarbonate resin may be steam precipitated to form a fluoropolymer concentrate for use as a drip inhibitor additive in thermoplastic resin compositions, as disclosed, for example, in U.S. Pat. No. 5,521,230. Alternatively, the fluoropolymer can be encapsulated.

In some instances it is desired to have PEI/PC, PEI/PCE, or PEI/PET compositions that are essentially free of bromine and chlorine. "Essentially free" of bromine and chlorine means that the composition has less than 3 wt. % of bromine and chlorine, and in other embodiments less than 1 wt. % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen per million parts by weight of the total composition (ppm). The amount of halogen can be determined by ordinary chemical analysis such as atomic absorption.

The PEI/PC, PEI/PCE, or PEI/PET composition can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the PET and polyimide polymers prior to melting. The melt processing is often done at 290 to 340° C. to avoid excessive polymer degradation while still allowing sufficient melting to get an intimate polymer mixture free of any unbelted components. The polymer blend can also be melt filtered using a 40 to 100 micron candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The composition can then be molded in any equipment conventionally used for thermoplastic compositions, such as a Newbury or van Dorn type injection-molding machine with conventional cylinder temperatures, at 250° C. to 320° C., and conventional mold temperatures at 55° C. to 120° C.

The physical properties of the when the PEI/PC, PEI/PCE, or PEI/PET composition can be varied to achieve the desired performance properties. In some embodiments, when the PEI/PC, PEI/PCE, or PEI/PET composition, specifically the PEI/PCR composition is exposed to a temperature of 110° C. for 10 days under steam and under pressure, the composition has a melt flow rate increase that is less than 100% greater than a melt flow rate of the composition at 0 days steam and pressure exposure, optionally where the compositions has less than 100 ppm by weight of the composition of a sodium aryl phosphinate salt. Melt flow can be measured in accordance with ASTM D1238 at 295° C. with 6.7 Kg.

In another embodiment, the PEI/PC, PEI/PCE, or PEI/PET composition, specifically the PEI/PCR composition, retains at least 60% of the initial tensile strength at yield of the composition, after exposure to 110° C. steam for 20 days, optionally where the compositions has less than 100 ppm by weight of the composition of a sodium aryl phosphinate salt. The initial tensile strength of the composition at yield can be from 9 to 15 MPa.

The physical properties of the composition can be varied to achieve the desired performance properties. In some embodiments the PEI/PC, PEI/PCE, or PEI/PET composition has a melt viscosity of 50 to 20,000 Pascal-seconds, 100 to 15,000 Pascal-seconds, or more specifically, 200 to 10,000 Pascal-seconds at 380° C. as measured by ASTM method D3835 using a capillary rheometer with a shear rate of 100 to 10,000 l/sec.

In another embodiment, the PEI/PC, PEI/PCE, or PEI/PET composition can have heat deflection temperature (HDT) of greater than or equal to 120° C., specifically 170° C. to 400° C., measured according to ASTM D648 on a 3.2 mm bar at 0.46 MPa (66 psi).

The composition can have a tensile strength greater than or equal to 30 MPa, specifically 5 To 20 MPa, measured in accordance with ASTM D648.

The PEI/PC, PEI/PCE, or PEI/PET composition can have a melt flow rate (MFR) at 360° C. of greater than 10 grams per 10 minutes, when measured in accordance with ASTM D1238 at 295° C. using a 6.7 Kg weight.

In an important feature, articles molded from the PEI/PC, PEI/PCE, or PEI/PET compositions have improved hydrostable. Articles made from these compositions withstand autoclave sterilization at temperatures of at least 270° F. (for as many as 500 cycles without deforming or blistering while maintaining their physical properties. Additionally, these compositions form articles that are sufficiently ductile to avoid cracking and breakage from routine handling, including dropping.

In particular, the PEI/PC, PEI/PCE, or PEI/PET composition has improved hydrolytic stability (i.e., exhibits a decrease in the amount of hydrolysis) over a comparative identical PEI/PC, PEI/PCE, or PEI/PET composition but without the calcined talc, which is measurable by determining the difference in Mw for the blended polymers of the PEI/PC, PEI/PCE, or PEI/PET composition before and after exposure to heat and moisture, according to the equation:

% Mw loss(for hydrostability)=[[Mw(after exposure)−Mw(before exposure)]/Mw(before exposure)]×100 wherein the change (referred to herein interchangeably as both reduction and loss) in molecular weight is calculated by the difference, expressed as a percentage, of Mw after exposure to temperature and humidity test conditions compared to Mw before exposure to temperature and humidity. In an embodiment, a molded article comprising the PEI/PC, PEI/PCE, or PEI/PET composition exhibits a reduction in weight averaged molecular weight (Mw) for the component polycarbonates of less than or equal to 12%, specifically less than or equal to 10%, and still more specifically less than or equal to 8.5%, oil exposure to combined heat and moisture conditions of 80° C. and 80% relative humidity (referred to as 80/80 conditions) for 1 week. In another embodiment, a molded article comprising the PEI/PC, PEI/PCE, or PEI/PET composition exhibits a reduction in weight averaged molecular weight (Mw) for the component polycarbonates of less than to 36%, specifically less than or equal to 30%, more specifically less than or equal to 25%, and still more specifically less than or equal to 24%, on exposure to combined heat and moisture conditions of 90° C. and 95% relative humidity (90/95 conditions) for greater 1 week.

The PEI/PC, PEI/PCE, or PEI/PET compositions can be formed into articles by any number of methods, for example, shaping, extruding (including profile extrusion), thermoforming, or molding, including injection molding, compression molding, gas assist molding, structural foam molding, and blow molding. In one embodiment a method of forming an article comprises shaping, extruding, blow molding, or injection molding the composition to form the article. PEI/PC, PEI/PCE, or PEI/PET compositions can also formed into articles using thermoplastic processes such as film and sheet extrusion, for example melt casting, blown film extrusion and calendaring. Co-extrusion and lamination processes can be used to form composite multi-layer films or sheets.

Because these compositions have a combination of improved hydrostability, they are useful in many applications that require toughness and clarity after exposure to hot water or steam. Examples of applications include: food service, medical, lighting, lenses, sight glasses, windows, enclosures, safety shields, and the like. The high melt flow allows the composition to be molded into intricate parts with complex shapes and/or thin sections and long flow lengths. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, including devices that have molded in snap fit connectors. The PEI/PC, PEI/PCE, or PEI/PET compositions can also be made into film and sheet as well as components of laminate systems. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

Without further elaboration, it is believed that one skilled in the art can, using the description herein, utilize the present invention. The following examples are included to provide additional guidance to those skilled in the art of practicing the claims. Accordingly, these examples are not intended to limit the invention in any manner.

EXAMPLES

Materials used in the Examples are listed Table 1. Amounts listed in the Examples are in weight percent, based on the total weight of the composition.

TABLE 1

| Component | Description (trade name) | Source |
| --- | --- | --- |
| PEI (Nitro) | PEI comprising structural units derived from phenylene diamine and bisphenol A dianhydride, Mw = 38000 g/mol, manufactured by nitro-displacement (ULTEM 1010). | SABIC Innovative Plastics |
| PEI (Cl) | PEI comprising structural units derived from bis 4-chloro m-phenylene phthalimide and bisphenol A, Mw = 38000 g/mol, manufactured by chloro-displacement (ULTEM 1010). | SABIC Innovative Plastics |

TABLE 1-continued

| Component | Description (trade name) | Source |
|---|---|---|
| PC | Polycarbonate (LEXAN ® 121, LEXAN ® 141) | SABIC Innovative Plastics |
| PCE | Polycarbonate-ester comprising 30 wt. % terephthalate ester, 30 wt. % isophthalate ester, 40 wt. % bisphenol A carbonate, Mw = 28,400 | SABIC Innovative Plastics |
| HT | Calcined hydrotalcite DHT-4C | Mitsui & Co. |
| I-168 | Tris(2,4-di-tert-butyl-phenyl phosphite (IRGAPHOS 168) | Ciba Co. |
| I-1010 | Tetra functional hindered phenol (IRGANOX 1010) | Ciba Co |
| SPP | Sodium phenyl phosphinate (SPP) | CAS # 4297-95-4 |

Techniques and Procedures

All ingredients were blended and dried at 250° F. (121° C.) prior to compounding. The grades were compounded on a 2½-inch (6.35 cm) S-4 single-screw vacuum vented extruder. A barrel temperature profile of 650-670° F. (343-354° C.) and a screw speed of 70-80 rpm were used.

Pellets were dried overnight at 275° F. (135° C.) and molded using standard temperature profile for the compositions.

Pellets and parts were placed into the "Pressure Cooker" at 110° C., and their melt flow rate (MFR) and tensile properties were measured as a function of hydro exposure duration.

Melt flow rate (MFR) was determined per ASTM D1238 at 295° C. using a 6.7 Kg weight. Tensile strength (at yield) was determined on injection-molded bars as per ASTM D638.

Examples 1-3 and Comparative Examples A-C

Formulations comprising 84.4 to 84.8 wt. % of PCE and 14.8 to 15.0 wt. % of PEI manufactured by nitro-displacement (PEI (Nitro)) (without SPP) and chloro-displacement (PEI (Cl)) (with or without sodium phenyl phosphinate (SPP)) and the indicated weight percent of HT were tested for melt flow rate at 295° C. using a 6.7 Kg weight and tensile strength at yield. Results are shown in Table 2.

strength retention, particularly in compositions containing PEI (Cl) containing SPP (sodium phenyl phosphinate).

In Examples A, B, and C, for instance, which did not contain any hydrotalcite, when the respective compositions were exposed to a temperature of 110° C. for 20 days under steam and under pressure, each composition had a melt flow rate that was more than 400% of the melt flow rate of the composition at 0 days. In Examples 1, 2, and 3, where the compositions contained 0.4 weight percent of hydrotalcite, when the respective compositions were exposed to a temperature of 110° C. for 20 days under steam and under pressure, each composition had a melt flow rate that was less than 400%, as compared to the melt flow rate of the composition at 0 days. They also showed higher tensile strength after 20 days steam exposure than samples with no hydrotalcite (Examples A, B and C).

Comparison of the compositions containing FIT and compositions that did not contain HT, suggest that the use of HT improves the hydro stability of the invention as shown by a smaller change in the melt flow rate and better tensile strength retention. High melt flow is an indicator of loss of molecular weight of the PCE polymer. This loss of molecular weight, if substantial enough (>40% of the original Mw values) will eventually results in loss of mechanical properties such as

TABLE 2

MFR and Tensile Strength of High PCE Content Blends

| | Ex. A (Comparative) | Ex. 1 Invention | Ex. B (Comparative) | Ex. 2 (Invention) | Ex. C (Comparative) | Ex. 3 (Invention) |
|---|---|---|---|---|---|---|
| PEI (Nitro) (no SPP) | 15.0 | 14.8 | 0.0 | 0.0 | 0.0 | 0.0 |
| PEI (Cl) (100 ppm SPP) | 0.0 | 0.0 | 15.0 | 14.8 | 0.0 | 0.0 |
| PEI (Cl) (no SPP) | 0.0 | 0.0 | 0.0 | 0.0 | 15.0 | 14.8 |
| PCE | 84.8 | 84.6 | 84.8 | 84.6 | 84.8 | 84.6 |
| I-1010 hindered phenol | 0.1 | 0.1 | 0.1 | 0.1 | 0.1 | 0.1 |
| I-168 aryl phosphite | 0.1 | 0.1 | 0.1 | 0.1 | 0.1 | 0.1 |
| HT | 0.0 | 0.4 | 0.0 | 0.4 | 0.0 | 0.4 |
| MFR, 295° C. (g/10 min.) | PEI (Nitro) No SPP No HT | PEI (Nitro) No SPP 0.4 HT | PEI (Cl) W/ SPP no HT | PEI (Cl) W/ SPP 0.4 HT | PEI (Cl) no SPP no HT | PEI (Cl) no SPP no HT |
| 0 days 110° C. steam | 5.9 | 7.4 | 6.8 | 6.8 | 6.4 | 6.8 |
| 1 day 110° C. steam | 6.2 | 7.5 | 7.1 | 7.1 | 6.9 | 6.8 |
| 3 days 110° C. steam | 7.6 | 8.8 | 12.6 | 8.2 | 8.9 | 8.5 |
| 10 days 110° C. steam | 11.1 | 10.1 | 32.9 | 11.7 | 15.4 | 10.4 |
| 20 days 110° C. steam | 50.5 | 24.4 | >100.0 | 32.3 | 66.1 | 26.1 |
| % Change in MFR, 0 vs. 20 days | +756% | +230% | +1371% | +375% | +933% | +284% |
| Tensile Strength MPa | | | | | | |
| 0 days 110° C. steam | 10.3 | 10.3 | 10.3 | 10.3 | 10.4 | 10.4 |
| 1 day 110° C. steam | 10.7 | 10.7 | 10.6 | 10.7 | 10.9 | 10.8 |
| 3 days 110° C. steam | 10.8 | 10.6 | 10.6 | 10.9 | 11.0 | 10.2 |
| 10 days 110° C. steam | 11.1 | 11.1 | 9.7 | 11.1 | 10.7 | 11.1 |
| 20 days 110° C. steam | 5.2 | 8.1 | 2.0 | 6.3 | 1.6 | 8.4 |

The data in Table 2 show that the presence of hydrotalcite in the formulations improves hydrostability and tensile impact and tensile strength. The composition of Example B, for instance, which was made with a chloro-displaced PEI, which contained SPP but which did not contain HT (calcined hydrotalcite) had a melt flow rate that was significantly more than 400% when the composition was exposed to a temperature of 110° C. for 20 days under steam and under pressure, as compared to the melt flow rate of the composition at 0 days. The composition of Example 2, which was also made with a chloro-displaced PEI, which contained SPP as well as HT, had a melt flow rate that was less than 400% when the composition was exposed to a temperature of 110° C. for 20 days under steam and under pressure, as compared to the melt flow rate of the composition at 0 days, suggesting that the use of the HT improves the melt flow retention of the compositions exposed to steam.

Examples 4 to 6 and Comparative Example D

Formulations comprising 84.4 to 84.8 wt. % of PCE and 14.6 to 15.0 wt. % of PEI manufactured by chloro-displacement (PEI (Cl)) (with SPP) and the indicated weight percent of HT were tested for melt flow rate at 295° C. using a 6.7 Kg weight. Results are shown in Table 3.

TABLE 3

MFR of High PCE Content Blends

|  | Ex. D (Comparative) | Ex. 4 (Invention) | Ex. 5 (Invention) | Ex. 6 (Invention) |
| --- | --- | --- | --- | --- |
| PEI (Cl) with 100 ppm SPP | 15.0 | 14.95 | 14.80 | 14.60 |
| PCE | 84.8 | 84.75 | 84.60 | 84.40 |
| I-1010 hindered phenol | 0.1 | 0.1 | 0.1 | 0.1 |
| I-168 aryl phosphite | 0.1 | 0.1 | 0.1 | 0.1 |
| HT | 0.0 | 0.1 | 0.4 | 0.8 |
| MFR, 295° C., 6.7 Kg (g/10 min.) | PEI (Cl) W/ SPP no HT | PEI (Cl) W/ SPP 0.1 HT | PEI (Cl) W/ SPP 0.4 HT | PEI (Cl) W/ SPP 0.8 HT |
| 0 days 110° C. steam | 7.3 | 6.6 | 6.7 | 7.7 |
| 1 day 110° C. steam | 9.5 | 7.3 | 7.6 | 9.3 |
| 5 days 110° C. steam | 27.7 | 8.9 | 9.3 | 11.2 |
| 10 days 110° C. steam | 144.0 | 10.5 | 11.9 | 14.5 |
| 20 days 110° C. steam | >500 | 23.9 | 26.0 | 43.6 |
| % Change in MFR, 0 vs. 20 days | +6749% | +262% | +288% | +466% |

The data in Table 3 show that the presence of hydrotalcite in the formulations improves hydrostability up to an amount of 0.5 wt. % of the composition in compositions containing PEI (Cl)) and SPP. Note that in comparing Examples 4, 5 and 6 that, surprisingly, lower level of calcined hydrotalcite (0.1 wt % in Ex. 4)) may be more beneficial in retarding MFR increase under hydrolysis than the higher levels (0.4 and 0.8 wt %) of examples 5 and 6. The higher levels of calcined hydrotalcite in Examples 5 and 8 are still superior in retarding MFR increase (Mw drop) than the control (Ex. D) with no hydrotalcite stabilizer.

Examples 7 to 8 and Comparative Example E

Formulations comprising 24.6 to 25 of PCE and 74.4 to 74.8 wt. % of PEI manufactured by chloro-displacement (PEI (Cl)) (made with SPP) and the indicated weight percent of HT were tested for melt flow rate at 337° C. using a 6.7 Kg weight. Results are shown in Table 4.

TABLE 4

MFR of Low PCE Content Blends

|  | Ex. E (Comparative) | Ex. 7 (Invention) | Ex. 8 (Invention) | Ex. 9 (Comparative) |
| --- | --- | --- | --- | --- |
| PEI (Cl) with 100 ppm SPP | 74.8 | 74.75 | 74.60 | 74.40 |
| PCE | 25.0 | 24.95 | 24.80 | 24.60 |
| I-1010 hindered phenol | 0.1 | 0.1 | 0.1 | 0.1 |
| I-168 aryl phosphite | 0.1 | 0.1 | 0.1 | 0.1 |
| HT | 0.0 | 0.1 | 0.4 | 0.8 |
| MFR 337° C. 6.7 Kg (g/10 min) | PEI (Cl) w/ SPP no HT | PEI (Cl) w/ SPP 0.1 HT | PEI (Cl) w/ SPP 0.4 HT | PEI (Cl) w/ SPP 0.8 HT |
| 0 days 110° C. steam | 27.2 | 22.1 | 22.1 | 23.4 |
| 1 day 110° C. steam | 38.6 | 27.4 | 33.4 | 45.1 |
| 5 days 110° C. steam | 53.6 | 31.2 | 34.5 | 116.0 |

TABLE 4-continued

| MFR of Low PCE Content Blends | | | | |
|---|---|---|---|---|
| | Ex. E (Comparative) | Ex. 7 (Invention) | Ex. 8 (Invention) | Ex. 9 (Comparative) |
| 10 days 110° C. steam | 84.3 | 38.4 | 43.6 | 122.0 |
| 20 days 110° C. steam | 338.0 | 70.3 | 126.0 | 385.0 |
| % Change in MFR, 0 vs. 20 days | 1143% | 218% | 470% | 1545% |

Table 3 show that the presence of hydrotalcite in the formulations improves hydrostability up to an amount of 0.5 wt. % of the composition in compositions containing PEI (Cl)) and SPP.

Example 9

Use of 0.3% wt MZP (mono zinc phosphate) in place of calcined hydrotalcite resulted in rapid MFR increase and material degradation and failure after only 3 days of pressure-cooking. (Data not shown.)

All patents and references cited herein are incorporated by reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A composition comprising, based on the total weight of the composition, from 10 to 90 wt. % of a polyimide with a weight average molecular weight of from 10,000 to 80,000 Daltons, of the formula

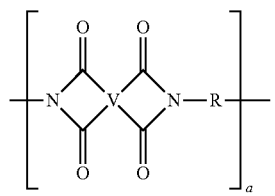

wherein
a is greater than 1,
V is a tetravalent aromatic group of the formula

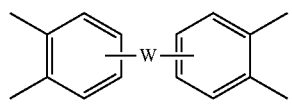

wherein W is a divalent moiety selected from —O—, —O—Z—O—, —SO$_2$—, or a combination thereof, wherein the divalent bonds of the —O—, the —O—Z—O—, and the —SO$_2$—group are in the 3,3', 3,4', 4,3', or the 4,4' positions, and wherein Z is a monocyclic or polycyclic moiety having 6 to 24 carbon atoms and optionally substituted with 1 to 8 C$_{1-8}$ alkyl groups, 1 to 8 halogen atoms, or a combination thereof, and
R is selected from an aromatic hydrocarbon group having 6 to 20 carbon atoms, a halogenated derivative thereof, a straight or branched chain alkylene group having 2 to 20 carbon atoms, a cycloalkylene group having 3 to 20 carbon atoms, or a divalent group of the formula

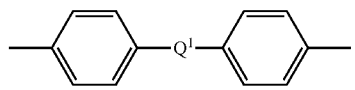

wherein Q$^1$ is —O—, —S—, —C(O)—, —SO$_2$—, —SO—, —C$_y$H$_{2y}$— wherein y is 1 to 5, and a halogenated derivative thereof;

from 10 to 90 wt. % of a polymer selected from a polycarbonate, polyester-polycarbonate, polyalkylene terephthalate, or a combination thereof;

from 0.005 to 1 wt. % of a hydrotalcite having a particle size of less than 10 micrometer and a magnesium oxide to aluminum oxide mole ratio of 1.0 to 5.0;

from 0.01 to 1.0 wt. % of a phosphorus-containing stabilizer;

from 0.01 to 1.0 wt. % of a hindered phenol stabilizer;

optionally, from 0 to 3 wt. % of a polyolefin; and optionally, from 0 to 5.0 wt. % of an inorganic metal oxide, wherein when the composition is exposed to a temperature of 110° C. for 10 days under steam and under pressure, the composition has a melt flow rate increase that is less than 100%, as compared to the melt flow rate, at 295° C. with 6.7 Kg, of the composition at 0 days steam and pressure exposure.

2. The composition of claim 1, having less than 100 ppm by weight of the composition of a sodium aryl phosphinate salt.

3. The composition of claim 1, wherein the polyimide is the product of a halo-displacement manufacturing process.

4. The composition of claim 1, wherein the phosphorus-containing stabilizer is tris(2,4-di-tert-butyl-phenyl) phosphite having a molecular weight of greater than 300 Daltons.

5. The composition of claim 1 comprising the polyolefin, wherein the polyolefin is a high-density polyethylene.

6. The composition of claim 1 comprising the metal oxide, wherein the metal oxide is a titanium dioxide having a mean particle size of less than 5 micrometers.

7. The composition of claim 1, wherein the hydrotalcite is calcined.

8. The composition of claim 7, wherein the calcined hydrotalcite has less than 30 ppm of mercury, lead, cadmium, arsenic, bismuth, or a combination thereof.

9. The composition of claim 1, wherein the polyester-polycarbonate comprises, based on the total weight of the polyester-polycarbonate, from greater than zero to 90 weight percent of a polymer containing recurring units of the formula:

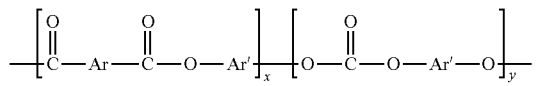

wherein x is 20 to 100 and y is more than zero to 80, based on 100 parts by weight of the polymer, Ar is divalent aromatic residue of a dicarboxylic acid or combination of dicarboxylic acids and Ar' is the divalent aromatic residue of a dihydric phenol or a mixture of dihydric phenols of the formula

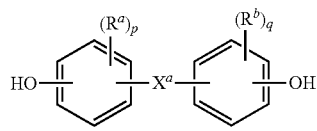

wherein $R^a$ and $R^b$ are each independently a halogen or a $C_{1-12}$ alkyl, $X^a$ is a single bond, —O—, —S—, —S(O)—, —S(O)$_2$—, —C(O)—, or a $C_{1-18}$ organic group, and p and q are each independently 0 to 4.

10. The composition of claim 9, wherein $X^a$ is a substituted or unsubstituted $C_{3-18}$ cycloalkylidene, a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group.

11. The composition of claim 10, wherein $X^a$ is isopropylidene and p and q are each zero.

12. The composition of claim 1, wherein the polyimide is a polyetherimide of the formula

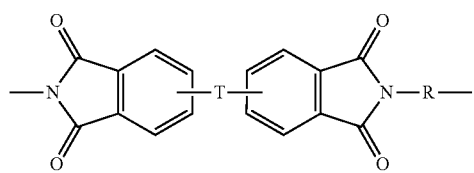

wherein

T is —O— or a group of the formula —O—Z—O— wherein the divalent bonds of the —O— or the —O—Z—O— group are in the 3,3', 3,4', 4,3', or the 4,4' positions and Z is a divalent radical of the formulae

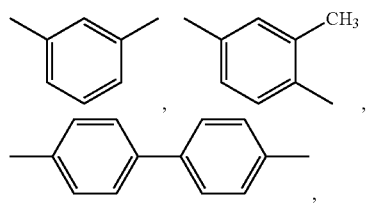

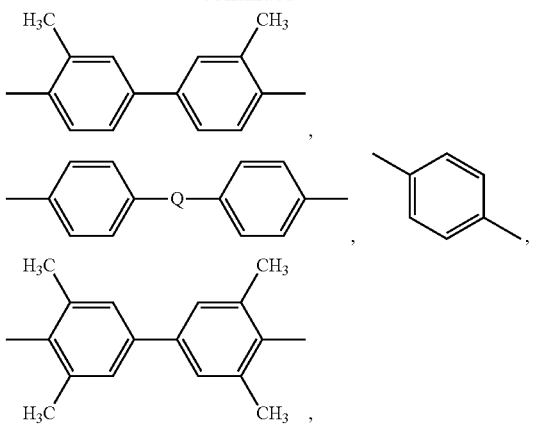

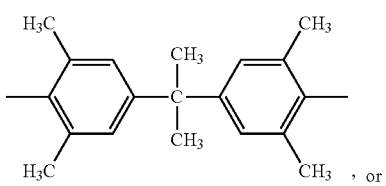

wherein Q is —O—, —S—, —C(O)—, —SO$_2$—, —SO—, or —C$_y$H$_{2y}$— wherein y is an integer from 1 to 5; and R is a divalent group of formula

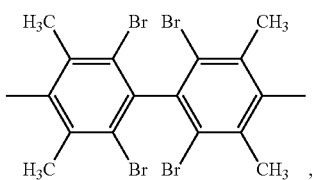

wherein $Q^1$ is —O—, —S—, —C(O)—, —SO$_2$—, —SO—, or —C$_y$H$_{2y}$— wherein y is an integer from 1 to 5.

13. The composition of claim 12, wherein R is m-phenylene, p-phenylene diarylsulfone, or a combination thereof.

14. The composition of claim 12, wherein the polyimide is a product of the reaction of a compound of the formula

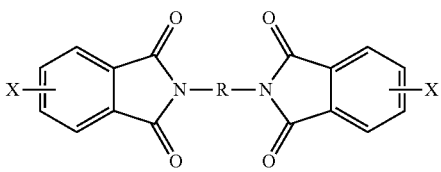

wherein X is bromine or chlorine and R is a divalent group of formula

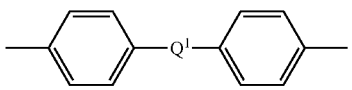

wherein Q$^1$ is —O—, —S—, —C(O)—, —SO$_2$—, —SO—, or —C$_y$H$_{2y}$— wherein y is an integer from 1 to 5, with
a compound of the formula

MO—Z—OM wherein M is an alkali metal salt and the divalent bonds of the —O—Z—O— group are in the 3,3', 3,4', 4,3', or the 4,4' positions and Z is a divalent radical of the formulae

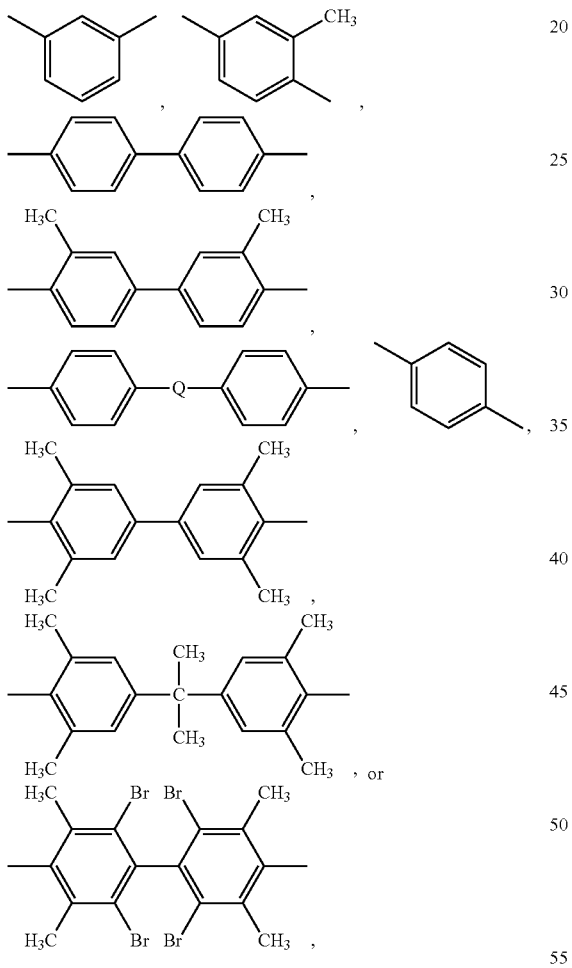

wherein Q is —O—, —S—, —C(O)—, —SO$_2$—, —SO—, or —C$_y$H$_{2y}$— wherein y is an integer from 1 to 5.

15. The composition of claim 14, wherein X is chloro, M is sodium, and R is m-phenylene, p-phenylene diaryl sulfone, or a combination thereof.

16. A method of manufacture of a composition, comprising melt blending the components of the composition of claim 1.

17. A method of forming an article, comprising shaping, extruding, blow molding, or injection molding the composition of claim 1 to form the article.

18. An article comprising the composition of claim 1.

19. The article of claim 18, selected from a sheet, film, multilayer sheet, multilayer film, molded part, extruded profile, coated part, and fiber.

20. A composition comprising, based on the total weight of the composition,
from 10 to 90 wt. % of a polyimide with a weight average molecular weight of from 10,000 to 80,000 Daltons, of the formula

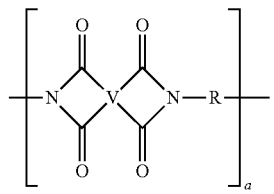

wherein
a is greater than 1,
V is a tetravalent aromatic group of the formula

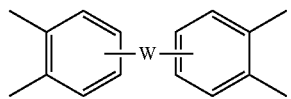

wherein W is a divalent moiety selected from —O—, —O—Z—O—, —SO$_2$—, or a combination thereof, wherein the divalent bonds of the —O—, the —O—Z—O—, and the —SO$_2$— group are in the 3,3', 3,4', 4,3', or the 4,4' positions, and wherein Z is a monocyclic or polycyclic moiety having 6 to 24 carbon atoms and optionally substituted with 1 to 8 C$_{1-8}$ alkyl groups, 1 to 8 halogen atoms, or a combination thereof, and
R is selected from an aromatic hydrocarbon group having 6 to 20 carbon atoms, a halogenated derivative thereof, a straight or branched chain alkylene group having 2 to 20 carbon atoms, a cycloalkylene group having 3 to 20 carbon atoms, or a divalent group of the formula

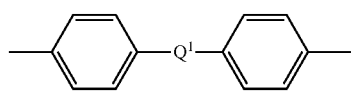

wherein Q$^1$ is —O—, —S—, —C(O)—, —SO$_2$—, —SO—, —C$_y$H$_{2y}$— wherein y is 1 to 5, and a halogenated derivative thereof;
from 10 to 90 wt. % of a polymer selected from a polycarbonate, polyester-polycarbonate, polyalkylene terephthalate, or a combination thereof;
from 0.005 to 1 wt. % of a hydrotalcite having a particle size of less than 10 micrometer and a magnesium oxide to aluminum oxide mole ratio of 1.0 to 5.0;
from 0.01 to 1.0 wt. % of a phosphorus-containing stabilizer;
from 0.01 to 1.0 wt. % of a hindered phenol stabilizer;
optionally, from 0 to 3 wt. % of a polyolefin; and
optionally, from 0 to 5.0 wt. % of an inorganic metal oxide,
wherein the composition retains at least 60% of its initial tensile strength at yield, after exposure to 110° C. steam for 20 days.

21. The composition of claim 20, wherein the initial tensile strength at yield is from 9 to 15 MPa.

22. A composition comprising, based on the total weight of the composition, from 15 to 85 wt. % of a polyimide with a weight average molecular weight (Mw) of from 40,000 to 80,000 Daltons, of the formula

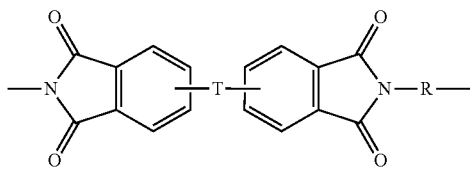

wherein

T is —O— or a group of the formula —O—Z—O— wherein the divalent bonds of the —O— or the —O—Z—O— group are in the 3,3', 3,4', 4,3', or the 4,4' positions and Z is a divalent radical of the formulae

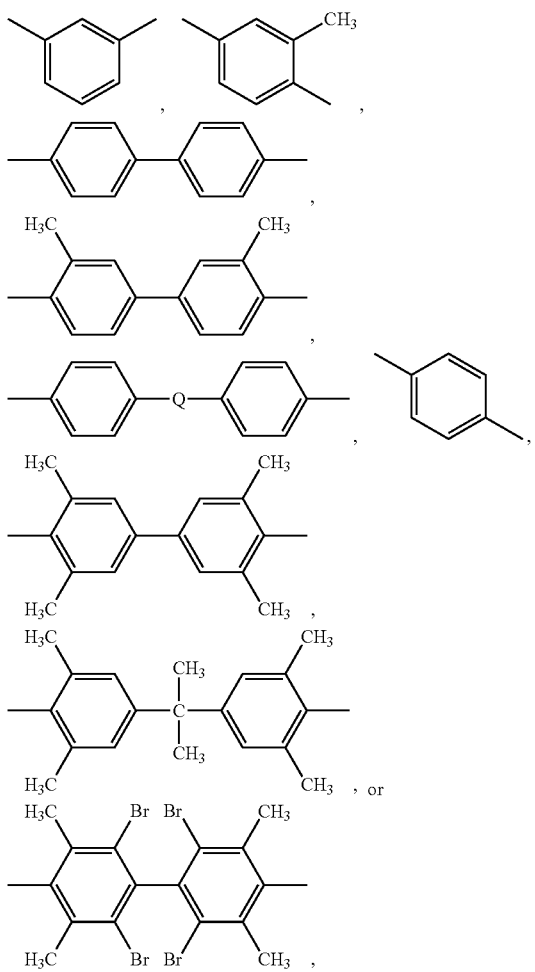

wherein Q is —O—, —S—, —C(O)—, —SO$_2$—, —SO—, or —C$_y$H$_{2y}$— wherein y is an integer from 1 to 5 and R is a divalent group of formula

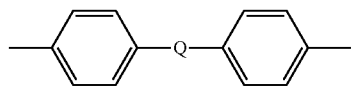

wherein Q is —O—, —S—, —C(O)—, —SO$_2$—, —SO—, or —C$_y$H$_{2y}$— wherein y is an integer from 1 to 5;

from 15 to 85 wt. % a polymer selected from a bisphenol A polycarbonate, a polyester-polycarbonate comprising units derived from bisphenol A, isophthalate and terephthalate, or a combination thereof;

from 0.1 to less than 0.8 wt. % of a calcined hydrotalcite having a particle size of less than 10 microns and a magnesium oxide to aluminum oxide mole ratio of 1.0 to 5.0.;

from 0.01 to 0.3 wt. % of a triaryl phosphorus-containing stabilizer with a molecular weight greater than 300 Daltons;

from 0.01 to 0.3 wt. % of a hindered phenol stabilizer with a molecular weight greater than 300 Daltons;

from 0.1 to 5.0 wt. % of a titanium dioxide with a mean particle size of less than 5 micrometers, wherein when the composition is exposed to a temperature of 110° C. for 10 days under steam and under pressure, the composition has a melt flow rate increase that is less than 100%, as compared to the melt flow rate, at 295° C. with 6.7 Kg, of the composition at 0 days steam and pressure exposure.

23. The composition of claim 22, wherein the calcined hydrotalcite is present in an amount that is from 0.1 to less than or equal to 0.4 wt. %, based on the total weight of the composition.

24. The composition of claim 22, wherein the polyimide is a product of the reaction of a compound of the formula

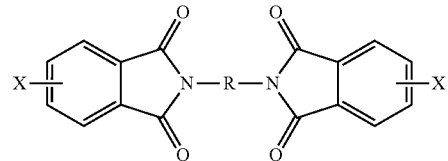

wherein X is bromine or chlorine and R is a divalent group of formula

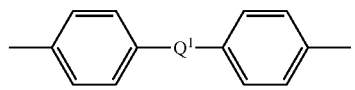

wherein Q$^1$ is —O—, —S—, —C(O)—, —SO$_2$—, —SO—, or —C$_y$H$_{2y}$— wherein y is an integer from 1 to 5, with a compound of the formula

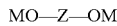

MO—Z—OM wherein M is an alkali metal salt and the divalent bonds of the —O—Z—O— group are in the 3,3', 3,4', 4,3', or the 4,4' positions and Z is a divalent radical of the formulae
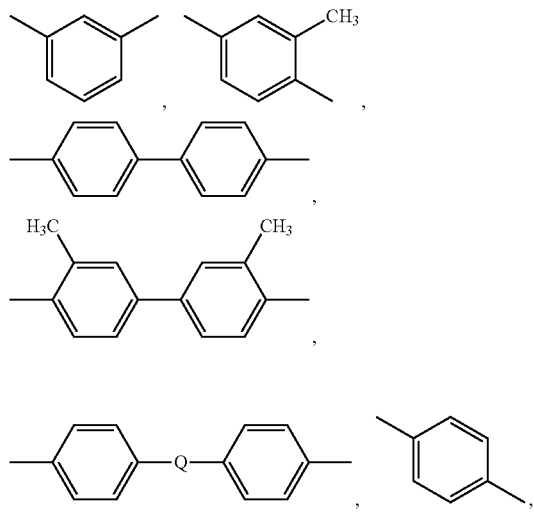
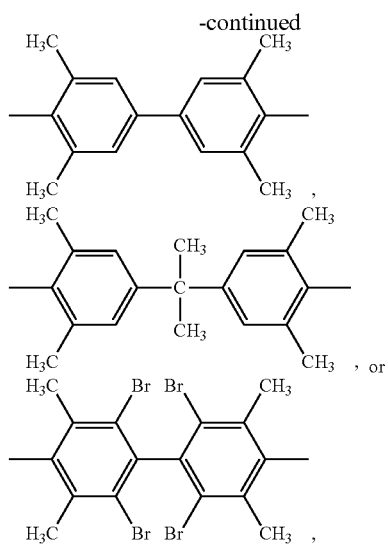
wherein Q is —O—, —S—, —C(O)—, —SO$_2$—, —SO—, or —C$_y$H$_{2y}$— wherein y is an integer from 1 to 5.
* * * * *